United States Patent [19]

Stucker

[11] 3,962,470
[45] June 8, 1976

[54] CONFECTION HOLDING DEVICE

[76] Inventor: James E. Stucker, 9212 Chiswell, Dallas, Tex. 75238

[22] Filed: Nov. 25, 1974

[21] Appl. No.: 527,075

[52] U.S. Cl. ............................ 426/135; 426/134; 426/421; D1/22; D1/99
[51] Int. Cl.² ...................... A23G 9/26; B65D 85/78
[58] Field of Search ............ 426/104, 132, 134, 135, 426/138, 139, 420, 421; D1/4–10, 99, 22; 273/58 K, 95 F; 43/43.1; 53/36, 239; 221/96

[56] References Cited
UNITED STATES PATENTS

| 239,063 | 3/1881 | Ross | 43/43.1 |
|---|---|---|---|
| 1,939,450 | 12/1933 | Horton | 426/139 X |
| 1,942,896 | 1/1934 | Jones | 426/139 |
| 2,096,532 | 10/1937 | Balton | 426/139 |
| 2,248,448 | 7/1941 | Chester | 426/139 X |
| 2,462,497 | 2/1949 | Heyman | 426/139 |
| 2,527,993 | 10/1950 | Habler | 426/139 X |
| 2,718,644 | 9/1955 | Barr | 273/58 K X |
| 2,735,778 | 2/1956 | Taylor | 426/134 X |
| 2,834,685 | 5/1958 | Ferguson | 426/134 X |
| 3,073,598 | 1/1963 | Tiikkainen | 273/95 F |
| 3,085,883 | 4/1963 | Collier | 426/104 |
| D192,225 | 2/1962 | Coleman | 426/134 X |

FOREIGN PATENTS OR APPLICATIONS

| 654,251 | 4/1929 | France | 426/134 |

Primary Examiner—Frank W. Lutter
Assistant Examiner—N. Greenblum
Attorney, Agent, or Firm—Richards, Harris, Medlock

[57] ABSTRACT

The specification discloses a confection holding device having a central body with an annular surface and two rigid symmetrical elongate members integrally attached to and perpendicularly extending from opposite sides of the central body. The symmetry of the holding device allows it to be mechanically inserted in a conical container without regard to its orientation. The annular surface of the central body engages the inner walls of a conical container, defining an upper chamber into which a confection may be placed. The central body and the upper elongate member support the body of a confection when the conical container is removed. The lower elongate member is held by the consumer as a handle to support the confection during consumption.

1 Claim, 6 Drawing Figures

CONFECTION HOLDING DEVICE

FIELD OF THE INVENTION

This invention relates to confection holding devices, and more particularly relates to a symmetrically shaped holding device which is suitable for automatic mechanical insertion within a conical container.

DESCRIPTION OF THE PRIOR ART

It has long been known to utilize rigid holding sticks of plastic or wood to support confections, such as ice cream or the like. In addition, it has become popular to provide a plastic statuette on one end of the confection holding device to hold the confection and to serve as a prize for the consumer. Such a confection holding device including a plastic statuette, is described in U.S. Pat. No. 3,085,883, issued Apr. 16, 1963.

However, such prior confection holding devices which include statuettes have been time consuming and expensive to insert into confection containers, inasmuch as care must be taken to orient the statuettes within the containers in the desired position. The corrrct orientation of the statuette within a conical container has thus heretofore been achievable only through time consuming and laborious manual insertion. Moreover, such pior confection holding devices which include statuettes present a risk of injury to the mouth of the consumer, due to the irregular and sharp shapes of the statuettes which are hidden by the confection.

A need has thus arisen for a confection holding device which automatically orients itself in a confection container when mechanically inserted, thereby resulting in a substantial savings in time and money over devices in the prior art. In addition, there is a need for a confection holding device which substantially reduces a consumer's risk of harm from mouth injuries caused by the shape of the holding device.

SUMMARY OF THE INVENTION

The present invention provides a symmetrical confection holding device offering a savings in time and money in its capability of automatically orienting itself upon mechanical insertion within a conical container, and a holding device which reduces the consumer's risk of harm from such an object.

In accordance with the present invention, a symmetrical holding device for a confection is positioned within an open ended conical container. The holding device has a central body portion with an annular surface of smaller circumference than that of the open end of the container, thereby enabling the annular surface of a central body to engage the inner surface of the container when positioned within it. The positioning of the holding device within the conical container thus divides it into first and second chambers, separated by the central body of the holding device.

In accordance with another aspect of the invention, the holding device has first and second elongate members extending perpendicularly from opposite sides of the annular surface of the central body. The elongate members are symmetrical about the annular surface of the central body. The first elongate member extends into the first upper chamber and the second elongate member extends into the second lower chamber, when the holding device is positioned within the conical container. The central body and first elongate member supports confection placed within the first chamber. The second elongate member, segregated from the confection by the seal of the central body, serves as a holding devive for supporting the confection when the conical container is removed.

BRIEF DESCRIPTION OF THE DRAWINGS

For a more complete understanding of the present invention and further objects and advantages thereof, reference is now made to the following description taken in conjunction with the following drawings.

DESCRIPTION OF THE PREFERRED EMBODIMENT

Figure 1:
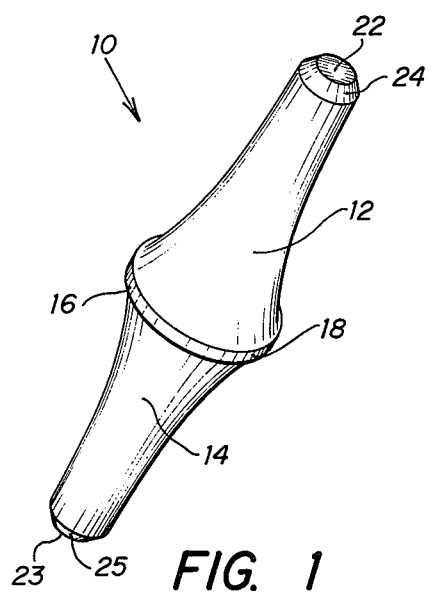
FIG. 1 is a perspective view of the preferred embodiment of the invention.

FIG. 1 shows a perspective view of the preferred embodiment of the present holding device, generally identified by the numeral 10. Elongate members 12 and 14 integrally extend from opposite sides of a central body portion 16, which is shaped as a circular disk. Elongate members 12 and 14 are symmetrical about and perpendicular to the annular surface 18 of central body portion 16. Elongate member 12 has a circular cross section throughout its length and has an upper relatively small diameter end 22 and a periphery which curves outwardly to a relatively large diameter lower portion integrally attached to central body 16. Elongate member 12 is connected by beveled annular surface 24 to its end 22. Elongate member 14 has a circular cross section throughout its length and has a relatively small diameter end 23 and a periphery which curves outwardly to a relatively large portion integrally attached to central body portion 16. Elongate member 14 is connected to end 23 by a beveled annular surface 25.

An important advantage of the confection is the substantial reduction in risk of injury to the mouth of the consumer. The periphery of elongate members 12 and 14 curving outwardly from their respective ends 22 and 23 conform more readily to the mouth than an irregularly and unknown shaped statuette. All the confection may be removed from the periphery of elongate member 12 without encountering any irregular shape or sharp object which might harm the consumer.

Figure 2:
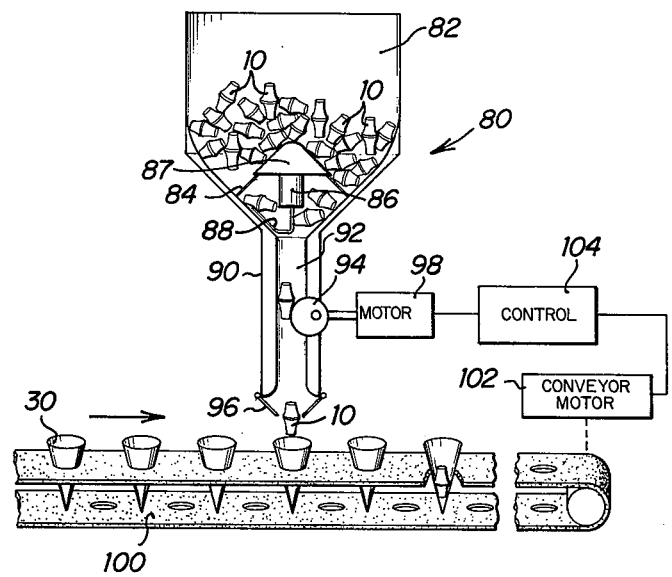
FIG. 2 illustrates a system for mechanically inserting the invention into an open ended conical confection container.

FIG. 2 illustrates a system for automatically mechanically inserting the invention 10 in an open ended conical container 30. The system consists of a mechanical apparatus, generally referred to by numeral 80, for storing and discharging one symmetrical holding device 10 into an open ended conical container 30 moving beneath the mechanical apparatus 80 on conveyor 100 powered by electrical motor 102. Electrical motor 102 is synchronized with discharge release motor 98 on mechanical apparatus 80 by a control unit 104.

The mechanical storage/discharge unit 80 has an elevated hopper 82 for storing a plurality of symmetrical holding devices 10 in random orientations. Pressure plate 84 is positioned within elevated hopper 82 above a circular opening 88 in hopper 82. Agitator 86 is a rigid member attached to pressure plate 84 and rotates directly above opening 88. Agitator 86 is powered by a small electrical motor 87 positioned within pressure plate 84 and moves holding devices above circular opening 88. Electrical motor 87 is connected to an outside power source through the walls of hopper 82. Agitator 86 provides a continuous flow of holding devices 10 from hopper 82 through opening 88.

Hopper opening 88 feeds holding devices 10 into the discharge unit 90. Holding devices 10 pass through the circular opening 88 into cylindrical tube 92 which has a circumference larger than that of annular surface 18 of central body portion 16. Symmetrical holding device 10 passes by gravity from opening 88 to discharge release mechanism 94 with elongate members 12 and 14 in the vertical plane within cylindrical tube 92. Discharge release mechanism 94 consists of an eccentric wheel energized by electric motor 98 synchronized through control 104 to conveyor motor 102. The discharge release mechanism 94 operates to maintain those holding devices 10 within cylindrical tube 92 while releasing a single holding device 10 to spring operated trap door 96 for release into open end of conical container 30 positioned beneath trap door 96 by conveyor 100.

Symmetrical holding device 10 automatically aligns itself upon dropping within conical container 30. This container 30 moves by conveyor 100 for the filling of the upper part of the conical container 30, defined by central body portion 16, with a confection such as ice cream or the like. The annular surface 18 of central body portions 16 snugly engages the inner walls of conical container 30 to provide a seal for the confection. It will of course be understood that the holding devices may be dropped into the containers 30 by any suitable conventional dispersing method.

Figure 3:
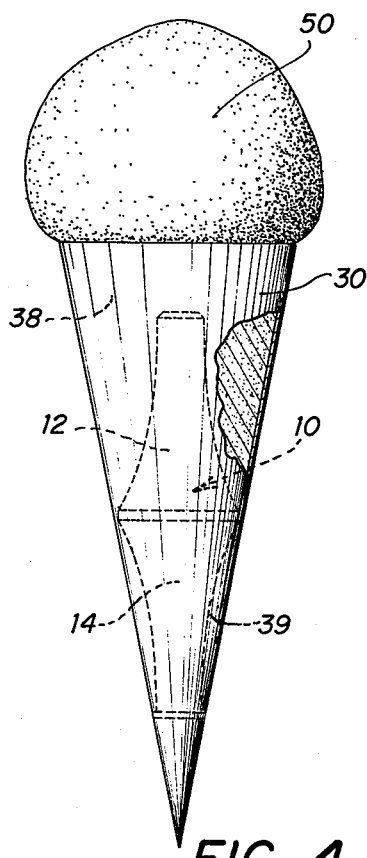
FIG. 3 is a side view of the preferred embodiment of the invention in an empty open ended conical confection container.

FIG. 3 is a side view of a symmetrical holding device 10 positioned within an empty open ended conical container 30. The circumference of the annular surface 18 of central body portion 16 is less than the circumference of the annular base 32 of conical container 30, thereby allowing holding device 10 to be positioned within container 30. Holding device 10 engages the inner surface of conical container 30 where the circumference of annular surface 18 is equal to the inner circumference of the conical container 30.

Central body portion 18 divides conical container 30 into first upper chamber 38 and second lower chamber 39. The upper chamber 38 is defined by the open end of conical container 30, the inner walls of conical container 30 up to the point where central body portion 16 engages the conical container 30, and the upper portion of central body portion 16 itself. The lower chamber 39 is defined by the opposite portion of central body portion 16 and the inner surface of conical container 30 extending from where central body portion 16 engages the surface of conical container 30 to the apex portion 34 of the conical container 30.

Elongate member 12 extends into upper chamber 38 and elongate member 14 extends into lower chamber 39. The beveled annular surface 25 engages the inner surface of conical container 30 at a point where the circumference of the beveled annular surface 25 is equal to the circumference of the annular surface of conical container 30. The engagement of symmetrical holding device 10 with the inner surface of conical container 30 by the central body portion 16 and beveled annular surface 25 automatically maintains the annular surface 18 of central body portion 16 perpendicular to the central axis 31 of conical container 30. The snug engagement of annular surface 18 with the inner walls of conical container 30 also serves to act as a seal to prevent the leakage of confection from the bottom of upper chamber 38 into lower chamber 39 and from the bottom of container 30 itself.

Figure 4:
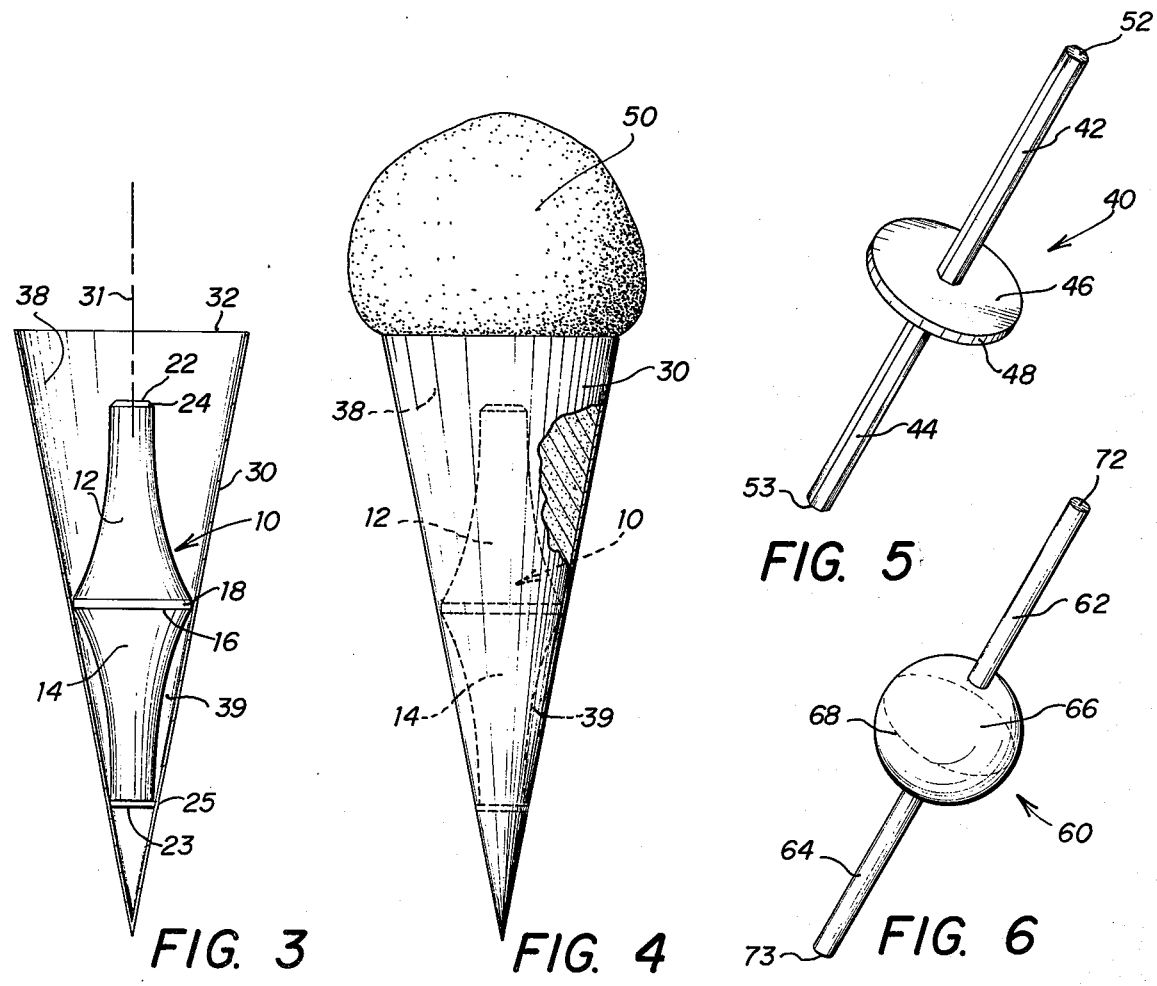
FIG. 4 is a side phantom view of the preferred embodiment of the invention positioned within an open ended conical container filled with a confection.

FIG. 4 is a side phantom view of symmetrical holding device 10 positioned within a conical container 30 filled with confection 50, such as ice cream, flavored ice, or the like. Confection 50 seals upper chamber 38 and an area above the open end of conical container 30. Confection 50 is supported by the inner walls of conical container 30, elongate member 12 extending in the upper chamber 38, and central body portion 16. Elongate member 14 is positioned within lower chamber 39 which contains no confection, since central body portion 16 seals confection from lower chamber 39. Upon removal of conical container 30, the confection is supported by elongate member 12 and central body portion 16. The curved periphery of elongate member 14 may be grasped between the thumb and forefinger of the consumer to hold the confection in position during its consumption.

Figure 5:
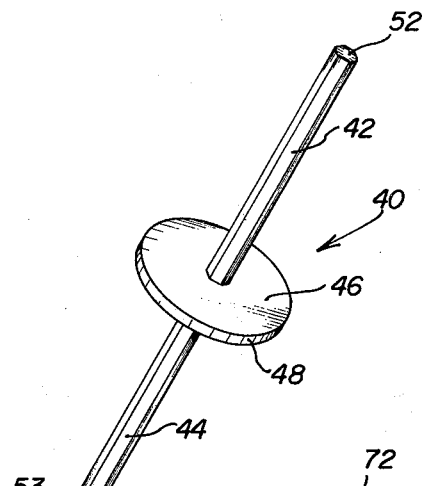
FIG. 5 is a perspective view of an alternate embodiment of the invention.

FIG. 5 illustrates an alternate embodiment of a symmetrical holding device generally identified by the numeral 40. Symmetrical holding device 40 consists of a central body portion 46 shaped as a thin circular disk. Central body portion 46 has an annular surface 48 for engaging the inner walls of conical container 30. Elongate members 42 and 44 are symmetrical about and perpendicular to the annular surface 48 of central body portion 46. Elongate members 42 and 44 are shaped as hexagonal rods of relatively small uniform cross section throughout the length of each.

The hexagonally shaped rods provide a rigid structure as a means for elongate member 42 to support confection and for elongate member 44 to be grasped between the thumb and forefinger as a handle. The hexagonal shape of the rod reduces slippage of the handle in the hand of the consumer. Elongate members 42 and 44 have ends 52 and 53, respectively, with hexagonal cross section.

Figure 6:
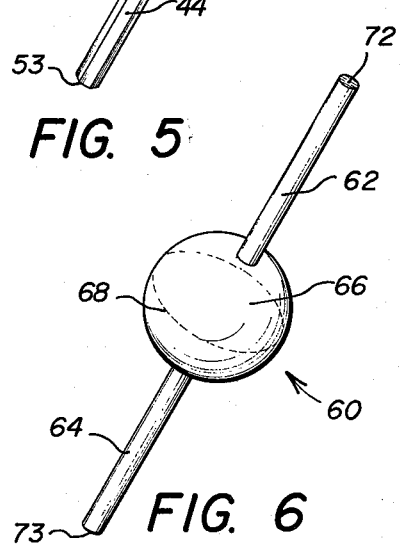
FIG. 6 is a perspective view of still another embodiment of the invention.

FIG. 6 is another alternate embodiment of a symmetrical holding device generally identified by the numeral 60. The central body portion 66 is a sphere with annular surface 68 around the middle of the sphere for engaging the inner surface of conical container 30. Elongate members 62 and 64 are symmetrical about and perpendicular to the annular surface 68 and are integrally attahed to sphere 66. Elongate members 62 ad 64 are shaped as cylindrical rods of uniform cross section. Elongate members 62 and 64 have circular ends 72 and 74, respectively.

It will be understood that devices may be constructed from any suitable material, but preferably made from plastic. It will be further understood that an elongate member may vary in cross sectional shape, or it may be of non-uniform cross section throughout its length.

Although preferred embodiments of the invention have been illustrated in the accompanying drawings and described in the foregoing detailed description, it will be understood that the invention is not limited to the embodiments disclosed, they are capable of numerous rearrangements, modifications, and substitutions of parts and elements without departing from the spirit of the invention.

What is claimed is:

1. A symmetrical confection holding device comprising:

a conical container which is partially filled with confection, a central body portion formed from an inedible rigid material and having a circular cross section defining a circumference substantially equal to the circumference of the midregion of said conical container, such that the periphery of said central body portion engages the inner surface of the midregion of the conical container when positioned within the conical container to thereby divide the conical container into first and second chambers, said confection filling said first chamber, fist and second elongate members formed from an inedible rigid material and extending in opposite directions from and perpendicularly with respect to said central body portion, said first and second elongate members having the same length, said elongate members being symmetrical about said circular cross section of said central body portion with each member being operable for use as a handle, said elongate members being configured such that said holding device may be deposited within the conical container in the correct position without regard to any required orientation of said elongate members, one of said elongate members extending into said first chamber when positioned within the conical container to extend into and support the confection filling said first chamber, the distal end of said one elongate member extending into said first chamber being positioned substantially below the end of the portion of the conical chamber which receives the confection, the other of said elongate members extending into the second chamber within the conical container to serve as a downwardly extending handle for supporting the confection when the conical container is removed therefrom, the distal end of said other elongate member extending substantially towards the apex of the conical container and engaging the side wall thereof and thereby orienting the circular cross section of the central body portion transversely relative to the axis of the cylindrical container, the end of each of said symmetrical elongate members having a beveled surface, whereby the beveled surface of the one of said elongate members extending into said second chamber snuggly engages the inner surface of the conical container near the apex portion of the conical container.

* * * * *

UNITED STATES PATENT OFFICE
CERTIFICATE OF CORRECTION

Patent No. 3,962,470            Dated June 8, 1976

Inventor(s) James E. Stucker

It is certified that error appears in the above-identified patent and that said Letters Patent are hereby corrected as shown below:

Col. 1, line 25, "corrct" should be --correct--.

Col. 2, line 5, "devive" should be --device--.

Col. 4, line 58, "attahed" should be --attached--;
      line 59, "ad" should be --and--.

Claim 1, line 22, "fist" should be --first--.

Signed and Sealed this

Seventeenth Day of August 1976

[SEAL]

Attest:

RUTH C. MASON
*Attesting Officer*

C. MARSHALL DANN
*Commissioner of Patents and Trademarks*